United States Patent
Ishihara

(10) Patent No.: US 8,028,796 B2
(45) Date of Patent: Oct. 4, 2011

(54) ASSEMBLY OF TIRE AND RIM

(75) Inventor: Taiga Ishihara, Shinjuku-ku (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/742,805

(22) PCT Filed: Nov. 6, 2008

(86) PCT No.: PCT/JP2008/070199
§ 371 (c)(1),
(2), (4) Date: May 13, 2010

(87) PCT Pub. No.: WO2009/063792
PCT Pub. Date: May 22, 2009

(65) Prior Publication Data
US 2010/0282537 A1 Nov. 11, 2010

(30) Foreign Application Priority Data
Nov. 15, 2007 (JP) .................. 2007-296836

(51) Int. Cl.
*F01N 5/00* (2006.01)
(52) U.S. Cl. ....................... 181/211; 152/450
(58) Field of Classification Search .......... 181/211; 152/450
See application file for complete search history.

(56) References Cited

U.S. PATENT DOCUMENTS

| 2005/0211358 A1* | 9/2005 | Tanno | 152/450 |
| 2005/0217777 A1* | 10/2005 | Yukawa et al. | 152/450 |
| 2007/0119533 A1* | 5/2007 | Yukawa | 152/450 |
| 2007/0175560 A1* | 8/2007 | Yukawa et al. | 152/450 |
| 2010/0282537 A1* | 11/2010 | Ishihara | 181/211 |

FOREIGN PATENT DOCUMENTS

| JP | 08-132816 A | 5/1996 |
| JP | 2003-048407 A | 2/2003 |
| JP | 2004-082387 A | 3/2004 |
| WO | 2007/051232 A1 | 5/2007 |

OTHER PUBLICATIONS

Viggo Tarnow, "Fiber movements and sound attenuation in glass wool" Dec. 24, 1997, Department of Applied Engineering Design and Production, Technical UNiversity of Denmark, Bygning 358, DK 2800 Lyngby, Denmark, pp. 1-7 pertinent.*

* cited by examiner

*Primary Examiner* — Forrest M Phillips
(74) *Attorney, Agent, or Firm* — Sughrue Mion, PLLC

(57) ABSTRACT

The present invention provides an assembly of a tire and a rim, which assembly has on the tire inner cavity side thereof a sound absorbing member capable of effectively suppressing cavity resonance and reducing road noise, while suppressing increase in weight of the tire and increase in volume of the sound absorbing member. In this assembly of a tire and a rim, the sound absorbing member is mounted on the inner cavity side of the tire as a sound absorbing layer for suppressing cavity resonance inside the tire. The sound absorbing member is unwoven cloth made of plural fibers, and the average distance d between fibers constituting the unwoven cloth is within the range of $0.50\delta$ to $4.00\delta$.

3 Claims, 3 Drawing Sheets

ASSEMBLY OF TIRE AND RIM

TECHNICAL FIELD

The present invention relates to an assembly of a tire and a rim, which assembly has on the inner cavity side of the tire a sound absorbing member for use as a sound absorbing layer for suppressing cavity resonance inside the tire. The present invention particularly relates to an assembly of a tire and a rim, which assembly aims at effectively suppressing cavity resonance of a tire when the tire is rotated with load exerted thereon and reducing road noise, while suppressing increase in weight of an assembly of a tire and rim and increase in volume of a sound absorbing member.

PRIOR ART

In a tire assembled with a rim and mounted to a vehicle, a tread portion thereof is brought into collision-contact with dents and recesses of a road surface and vibrates during running of the vehicle, whereby air charged in the inner cavity of the tire causes cavity resonance. This cavity resonance is one of the main reasons for road noise, and resonance frequency generally exists in the range of 180 to 300 Hz. When road noise is transmitted to the interior of the vehicle, the noise is perceived as strident noise by an occupant inside the vehicle because road noise has, different from noises of other frequency bands, relatively sharp and high peak values.

In order to suppress such cavity resonance and reduce road noise, Japanese patent 3622957 proposes a tire including an annular sound absorbing layer for suppressing sound, which layer is formed by unwoven cloth and fixed in the inner cavity defined between a rim and the tire assembled with the rim in the tire circumferential direction. Further, JP 2003-048407 Laid-Open proposes a tire, in which a sound absorbing layer formed by a sponge material is fixed on the inner surface of a tire.

DISCLOSURE OF THE INVENTION

Problems to be Solved by the Invention

However, regarding the tire of Japanese patent 3622957, although the tire attempts to suppress cavity resonance, further suppression of cavity resonance has been demanded. Regarding the tire of JP 2003-048407 Laid-Open, although the tire suppresses cavity resonance by using a sponge material satisfying a predetermined conditions, further suppression of cavity resonance has been demanded as in Japanese patent 3622957. Further, in the case of using a sponge material, the weight of the sound absorbing layer is relatively large and thus the weight of the tire as a whole increases, whereby rolling resistance may deteriorate and, if the sponge material is adhered unevenly in the tire circumferential direction, uniformity of the tire may deteriorate, as well.

Accordingly, the present invention aims at solving the problems described above and an object thereof is to provide an assembly of a tire and a rim, which assembly has on the tire inner cavity side thereof a sound absorbing member capable of effectively suppressing cavity resonance of the tire and reducing road noise, while suppressing increase in weight of the tire and increase in volume of the sound absorbing member.

Means for Solving the Problem

In order to achieve the aforementioned object, the present invention provides an assembly of a tire and a rim, which assembly has on the tire inner cavity side thereof a sound absorbing member for use as a sound absorbing layer for suppressing cavity resonance inside the tire. The sound absorbing member is constituted of unwoven cloth made of plural fibers. Provided that density of a gas with which a tire is charged is $\rho_a$, primary natural angular frequency of cavity resonance of the gas charged in the tire inner cavity of the assembly of the tire and the rim with no load exerted thereon is $\omega$, and viscosity coefficient of the charged gas is $\eta$, peripheral thickness $\delta$ of the charged gas around fibers of unwoven cloth is defined as follows.

$$\delta = \sqrt{\frac{2\eta}{\omega \rho_a}} \qquad \text{[Mathematical formula 1]}$$

The average distance d between fibers is to be within the range of $0.50\delta$ to $4.00\delta$. The average distance d between fibers is more preferably within the range of $0.70\delta$ to $2.50\delta$. Since the average distance d between fibers is within the range of $0.50\delta$ to $4.00\delta$, when such unwoven cloth is disposed in a tire, cavity resonance can be effectively suppressed and road noise can be further reduced without significantly increasing the weight of the tire. In a case where the average distance d between fibers is smaller than $0.50\delta$, regions around fibers for effectively absorbing sound overlap each other excessively, whereby the volume occupied by the fibers themselves increases and an effect of absorbing sound rather deteriorates. In a case where the average distance d between fibers exceeds $3.00\delta$, regions which are not the regions around fibers capable of effectively absorbing sound increase too much, whereby the sound absorbing effect deteriorates. In the present invention, "peripheral thickness of the charged gas around fibers" represents main portions of regions around fibers where, when a gas having vibration energy by cavity resonance is brought into contact with fibers constituting unwoven cloth, the gas is trapped around the fibers due to Newton's law of viscosity and the vibration energy is absorbed. Further, "density of a gas with which a tire is charged" and "viscosity coefficient of the charged gas" in the present invention represent general density and viscosity coefficient of a gas charged in a tire, respectively. Since these density and viscosity coefficient change in accordance with the temperature of the charged gas, respective values thereof are decided based on measurement according to "Chronological Scientific Tables (Rika Nenpyo) 2008". Yet further, "primary natural angular frequency of cavity resonance of the gas charged in the tire inner cavity" in the present invention represents primary natural angular frequency observed when cavity resonance in an inner cavity of a tire is measured in a state where the tire is not provided with a sound absorbing layer. Yet further, a "gas" in the present invention represents a gas generally charged in a tire, e.g. an inert gas such as air, nitrogen gas or the like.

It is preferable to provide the sound absorbing member on an inner surface of an inner liner.

Further, it is preferable to provide the sound absorbing member on the rim.

EFFECT OF THE INVENTION

According to the present invention, by optimizing a structure, it is possible to provide an assembly of a tire and a rim, which assembly has on the tire inner cavity side thereof a sound absorbing member capable of effectively suppressing cavity resonance of the tire and reducing road noise, while suppressing increase in weight of the tire and increase in volume of the sound absorbing member.

EXPLANATION OF REFERENCE NUMERALS

| | |
|---|---|
| 1 | Tire |
| 2 | Tread portion |
| 3 | Sidewall portion |
| 4 | Bead portion |
| 5 | Tire main body |
| 6 | Bead core |
| 7 | Carcass |
| 8 | Belt |
| 9 | Tire inner cavity |
| 10 | Inner liner |
| 11 | Sound absorbing layer |
| R | Rim |

BEST MODE FOR IMPLEMENTING THE INVENTION

Figure 1:
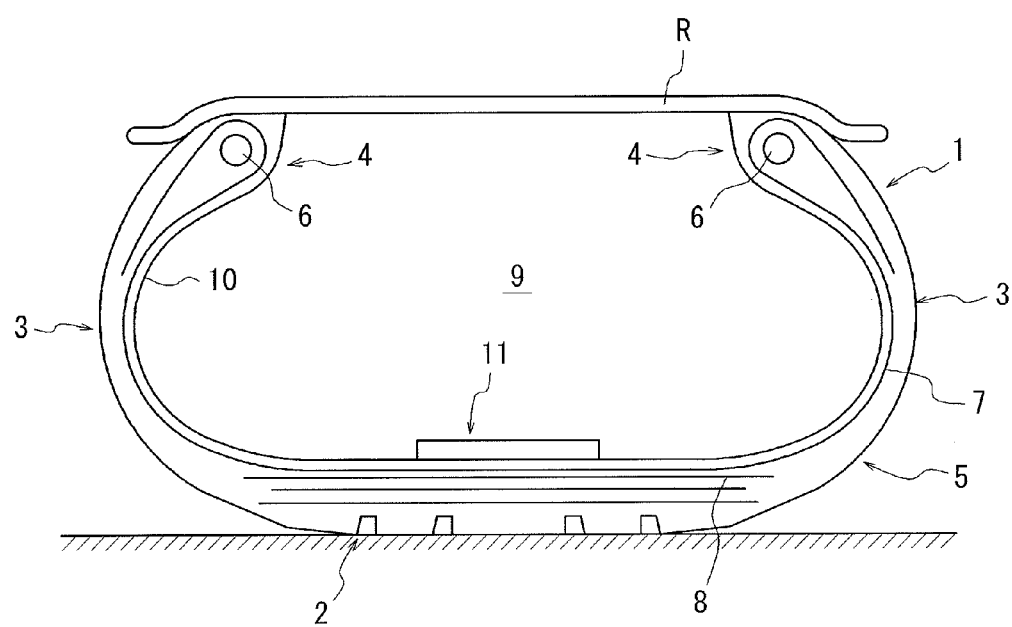
FIG. 1 is a sectional view in the tire widthwise direction of an assembly of a tire and a rim according to the present invention.
Figure 2:
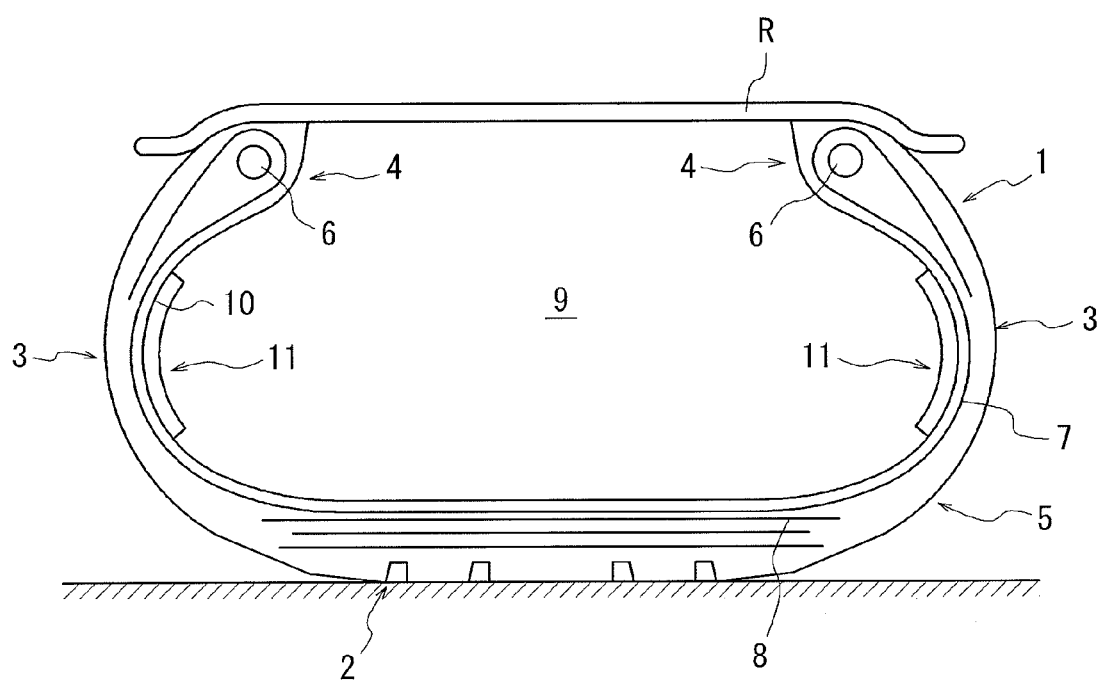
FIG. 2 is a sectional view in the tire widthwise direction of another assembly of a tire and a rim according to the present invention.
Figure 3:
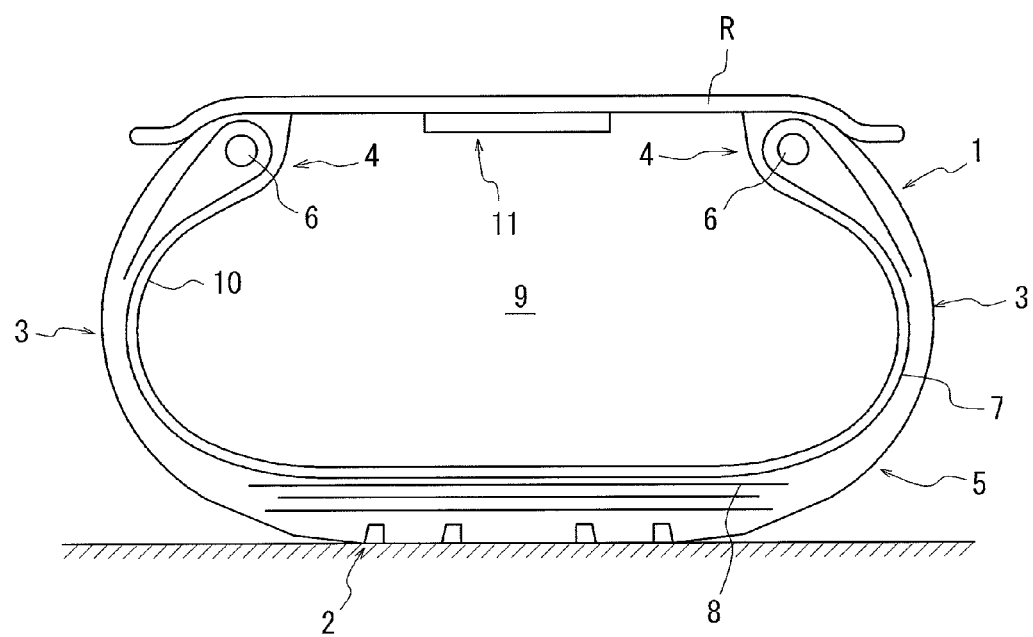
FIG. 3 is a sectional view in the tire widthwise direction of yet another assembly of a tire and a rim according to the present invention.

Hereinafter, an embodiment of the present invention will be described with reference to drawings. FIG. 1 is a sectional view in the tire widthwise direction of an assembly of a tire and a rim according to the present invention. FIGS. 2 and 3 are sectional views in the tire widthwise direction of other assemblies of tires and rims according to the present invention, respectively.

In a tire 1, a tire main body 5 is constituted of, according to conventional practice: a tread portion 2 which is brought into contact with a road surface; a pair of sidewall portions 3, 3 extending on the inner side in the tire radial direction from respective side portions of the tread portion 2; and a pair of bead portions 4, 4 provided on the inner side in the tire radial direction of the respective sidewall portions 3, 3 to be engaged with a rim R. Inside the tire main body 5, there are provided: a carcass 7 extending in a toroidal shape between bead cores 6, 6 embedded in the respective bead portions 4, 4 to form a skeletal structure, e.g. a radial structure, of the tire main body 5; and a belt 8 located on the outer peripheral side of a crown region of the carcass 7 for reinforcing the tread portion 2. Further, an air-impermeable inner liner 10 is provided on the inner surface side, i.e. the side facing a tire inner cavity 9 defined by the tire 1 and the rim R, of the tire main body 5.

A sound absorbing layer 11 is provided on the inner surface of the tread portion, as shown in FIG. 1. Due to this, vibration energy of a charged gas associated with cavity resonance which occurred in the tire inner cavity 9 is converted into inner vibration energy of unwoven cloth constituting the sound absorbing layer 11 and consumed as thermal energy, so that cavity resonance is reduced. The sound absorbing layer may be disposed not only on the inner surface of the tread portion but also on the inner surface of the sidewall portions 3, as shown in FIG. 2. Further, the sound absorbing layer may be disposed on the rim, as shown in FIG. 3.

The sound absorbing member mounted as the sound absorbing layer 11 in a tire is constituted of unwoven cloth made of plural fibers. Provided that density of a gas with which a tire is charged is $\rho_a$, primary natural angular frequency of cavity resonance effected by the gas charged in the tire inner cavity 9 of the assembly of the tire and the rim with no load exerted thereon is $\omega$, and viscosity coefficient of the charged gas is $\eta$, peripheral thickness $\delta$ of the charged gas around fibers of unwoven cloth is defined as follows.

$$\delta = \sqrt{\frac{2\eta}{\omega \rho_a}}$$ [Mathematical formula 1]

The average distance d between fibers is preferably within the range of $0.50\delta$ to $4.00\delta$. The average distance d between fibers is more preferably within the range of $0.70\delta$ to $2.50\delta$. As a result of experimentally analyzing distance ranges within which an effective sound absorbing rate is obtained, by disposing inside a tire each of sound absorbing members of various types in which the average distance d between fibers has been varied, it has been understood that, when the average distance d between fibers is within the range of $0.50\delta$ to $4.00\delta$, a sound absorbing effect remarkably improves and an effective sound absorbing rate is obtained. An effective sound absorbing rate is obtained when the average distance d between fibers is within the range of $0.50\delta$ to $4.00\delta$ because then the sound absorbing regions capable of effectively causing a sound absorbing effect, of respective fibers, are prevented from overlapping each other excessively, whereby cavity resonance is effectively suppressed and road noise is further reduced. In a case where the average distance d between fibers is smaller than $0.50\delta$, regions around fibers capable of effectively absorbing sound overlap each other excessively, whereby the volume occupied by the fibers themselves increases and an effect of absorbing sound rather deteriorates. In a case where the average distance d between fibers exceeds $3.00\delta$, regions which are not the regions around fibers capable of effectively absorbing sound increase too much, whereby the sound absorbing effect deteriorates. Accordingly, in the present invention, it is possible to ensure an effective sound absorbing effect, while suppressing increase in tire weight, which would occur if a sponge material were to be adhered as a sound absorbing layer.

Further, provided that density of unwoven cloth is $\rho_b$, density of fibers is $\rho_f$, and average sectional radius of fibers is r, the average distance d between fibers and porosity $\Phi$ of unwoven cloth are defined by formulae below.

$$d = \sqrt{\pi r^2 \frac{\rho_f}{\rho_b}}$$ [Mathematical formula 2]

$$\Phi = 1 - \frac{\rho_b}{\rho_f}$$ [Mathematical formula 3]

Provided that the number of fibers per unit sectional area of unwoven cloth is n and average sectional radius of the fibers is r (the sectional area A of each fiber in unit sectional area of unwoven cloth is then obtained as $A=\pi r^2$), there exists a relationship below.

$$\frac{n \times A}{1 \times 1} = \frac{\rho_b}{\rho_f} \quad \text{[Mathematical formula 4]}$$

The mathematical formula above can be converted into a formula below.

$$n = \frac{\rho_b}{\rho_f} \times \frac{1}{A} \quad \text{[Mathematical formula 5]}$$

On the other hand, the average distance d between fibers can be expressed by Mathematical formula 6 below.

$$d = \frac{1}{\sqrt{n}} \quad \text{[Mathematical formula 6]}$$

Accordingly, the average distance d between fibers can be expressed as below or by the aforementioned Mathematical formula 2 by substituting Mathematical formula 5 into n of Mathematical formula 6.

$$d = \sqrt{\pi r^2 \frac{\rho_f}{\rho_b}} \quad \text{[Mathematical formula 2]}$$

In the present invention, the "average sectional radius r of fibers" is obtained by, for example, measuring sectional radii of fibers at ten arbitrary positions by using a scanning electron microscope (SEM) or an optical microscope and calculating the average radius thereof.

As porosity of unwoven cloth decreases, unwoven cloth tends to reflect at a surface thereof sound wave having vibration energy which potentially causes cavity resonance sound, whereby such vibration energy as described above is less likely to be absorbed inside the unwoven cloth. Due to this, porosity $\Phi$ is preferably not smaller than 0.95. By setting porosity $\Phi$ at not smaller than 0.95, sound wave having vibration energy which potentially causes cavity resonance sound effectively transmits through unwoven cloth and the unwoven cloth sufficiently absorbs the vibration energy, whereby road noise can be reduced, thereby further improving a sound absorbing effect.

Density of unwoven cloth $\rho_b$ is preferably smaller than 20 kg/m$^3$. In a case where density of unwoven cloth $\rho_b$ is equal to or exceeds 20 kg/m$^3$, the weight of the sound absorbing layer 11 is too large, whereby the fuel consumption rate may deteriorate due to this increase in weight. Further, in a structure in which unwoven cloth is adhered unevenly inside a tire, uniformity of the tire 1 may deteriorate as the weight of unwoven cloth inceases.

In a case where the sound absorbing layer 11 is adhered on the rim R or the tire main body 5, the sound absorbing layer 11 may be chemically attached to the inner surface of the inner liner 10 by using a styrene-butadiene rubber-based latex adhesive agent, an aqueous polymer-isocyanate based adhesive agent or an acryl-based/synthetic resin-based adhesive tape. In a case where the sound absorbing layer 11 is adhered to the tire main body 5 which has not been vulcanized, it is possible to first tentatively fix the sound absorbing layer by such an adhesive tape or agent as described above and then impregnate the sound absorbing layer 11 with the inner surface of the inner liner 10 by vulcanization molding by heating and pressurizing to physically fix the sound absorbing layer to the tire main body.

The foregoing descriptions only show a part of embodiments of the present invention and the structures thereof may be combined with each other and/or various changes may be made thereto unless such combination and/or changes digress from the spirit of the present invention.

EXAMPLES

Next, a conventional tire lacking a sound absorbing layer (Conventional tire); another conventional tire having a sound absorbing layer constituted of a sponge material on the inner surface of a tread portion (Comparative Example tire 1); comparative example tires each having on the inner surface of a tread portion a sound absorbing layer constituted of unwoven cloth of which average distance d between fibers is beyond the range of 0.50δ to 4.00δ (Comparative Example tires 2 to 4); and tires according to the present invention each having a sound absorbing layer constituted of unwoven cloth of which average distance d between fibers is within the range of 0.50δ to 4.00δ (Example tires 1 to 6), were prepared as radial test tires of tire size 215/45R17 for a passenger vehicle and subjected to various evaluation, respectively. The details will be described below.

Each of these test tires was assembled with a rim having size 17×7JJ to obtain a tire wheel. Each tire wheel was mounted to a vehicle at air pressure: 210 kPa (relative pressure) and the tire temperature: 25° C. in a state where load of 3.92 kN was applied to the tire and subjected to various evaluations described below. In the evaluations, primary natural angular frequency ω of cavity resonance of the gas charged in the tire inner cavity of the assembly of the tire and the rim with no load exerted thereon is 1414 rad/s, viscosity coefficient η of the charged gas is 1.82×10$^{-5}$ Pa·s, and density $\rho_a$ of the charge gas is 3.64 kg/m$^3$. Accordingly, the peripheral thickness δ is 84.3 μm.

Comparative Example tire 1 has a sponge material (type of material: polyurethane, density: 50 kg/m$^3$) on the inner liner at the inner surface of a tread portion thereof. Comparative Example tires 2 to 4 have on inner liners at the inner surfaces of tread portions thereof unwoven cloths of which average distances d between fibers when the tires are assembled with rims are 39.4 μm, 373.9 μm and 144.8 μm, respectively. Comparative Example tires 2-4 have characteristics as shown in Table 1, respectively. Example tires 1 to 6 have on inner liners at the inner surfaces of tread portions thereof unwoven cloths of which average distances d between fibers are 44.0 μm, 50.8 μm, 64.0 μm, 128.0 μm, 204.8 μm and 334.4 μm, respectively. Example tires 1-6 have characteristics as shown in Table 1, respectively. The unwoven cloth serving as the sound absorbing layer is constituted of a belt-shaped PET unwoven cloth having thickness: 14 mm and width: 100 mm and adhered to the inner surface of each tread portion along the entire circumference by a double-stick tape (an acryl-based adhesive material).

TABLE 1

|  | Density of fiber (kg/m³) | Density of unwoven cloth (kg/m³) | Porosity of unwoven cloth | Average sectional radius of fiber | Density of sponge |
| --- | --- | --- | --- | --- | --- |
| Conventional tire 1 | — | — | — | — | — |
| Comparative Example tire 1 | — | — | — | — | 50 kg/m³ |
| Comparative Example tire 2 | 1335 | 50 | 0.96 | 4.3 μm | — |
| Comparative Example tire 3 | 1335 | 12 | 0.99 | 20.0 μm | — |
| Comparative Example tire 4 | 1335 | 80 | 0.94 | 20.0 μm | — |
| Example tire 1 | 1335 | 40 | 0.97 | 4.3 μm | — |
| Example tire 2 | 1335 | 30 | 0.97 | 4.3 μm | — |
| Example tire 3 | 1335 | 40 | 0.97 | 6.3 μm | — |
| Example tire 4 | 1335 | 10 | 0.99 | 6.3 μm | — |
| Example tire 5 | 1335 | 40 | 0.97 | 20.0 μm | — |
| Example tire 6 | 1335 | 15 | 0.98 | 20.0 μm | — |

A cavity resonance-suppressing effect was analyzed by measuring vehicle interior noise when vehicles having Conventional tire, Comparative Example tires 1, 2 and Example tires 1-3 mounted thereon, respectively, ran on an asphalt road surface at 60 km/h. The measurement results were analyzed in terms of frequency, and a cavity resonance-suppressing effect was evaluated according to the sound pressure levels at peaks observed in the vicinity of 230 Hz. Regarding the evaluation results in the Table, the sound pressure level of Conventional tire was set as the reference, the magnitude of decrease in sound pressure level in Comparative Example tire 1, as compared with Conventional tire, was expressed as 100, and the magnitude of decrease in sound pressure in each of other test tires was expressed by an index value relative thereto. The larger index value represents the larger cavity resonance-suppressing effect. The evaluation results are shown in Table 2.

The tire weight was evaluated by measuring weights of the respective tires. Regarding the evaluation results in the Table, the weight of Conventional tire was set as the reference, the magnitude of increase in tire weight in Comparative Example tire 1, as compared with Conventional tire, was expressed as 100, and the magnitude of increase in tire weight in each of other test tires was expressed by an index value relative thereto. The larger index value represents the larger increase in tire weight. The evaluation results are shown in Table 2.

TABLE 2

|  | d/δ | Cavity resonance-suppressing effect | Increase in tire weight |
| --- | --- | --- | --- |
| Conventional tire 1 | — | — | — |
| Comparative Example tire 1 | — | 100 | 100 |
| Comparative Example tire 2 | 0.47 | 76 | 100 |
| Comparative Example tire 3 | 4.43 | 71 | 24 |
| Comparative Example tire 4 | 1.72 | 85 | 160 |
| Example tire 1 | 0.52 | 107 | 80 |
| Example tire 2 | 0.6 | 117 | 60 |
| Example tire 3 | 0.76 | 127 | 80 |
| Example tire 4 | 1.52 | 173 | 20 |
| Example tire 5 | 2.43 | 156 | 80 |
| Example tire 6 | 3.96 | 105 | 30 |

As is obvious from the results shown in Table 2, Comparative Examples tires 1-4 and Examples tires 1-6 suppress cavity resonance and reduce road noise, as compared with Conventional tire lacking a sound absorbing layer. Examples tires 1-6 each exhibit an improved effect of suppressing cavity resonance, as compared with Comparative Example tires 1-4. The improvement in the effect is particularly obvious in Example tires 4 and 5. Further, increase in tire weight is suppressed in Comparative Example tire 3 and Example tires 1-6. In view of these results, it is concluded that Example tires 1-6 effectively suppress cavity resonance of tires, with suppressing increase in tire weight.

INDUSTRIAL APPLICABILITY

As is obvious from the foregoing descriptions, according to the present invention, it is possible to provide an assembly of a tire and a rim, which assembly has on the tire inner cavity side thereof a sound absorbing member capable of effectively suppressing cavity resonance of the tire and reducing road noise, while suppressing increase in weight of the tire and increase in volume of the sound absorbing member.

The invention claimed is:

1. An assembly of a tire and a rim, comprising:
   a sound absorbing member provided on the tire inner cavity side of the assembly, the sound absorbing member forming a sound absorbing layer for suppressing cavity resonance inside the tire, wherein:
   the sound absorbing member is constituted of unwoven cloth made of plural fibers; and
   provided that density of a gas with which a tire is charged is $p_a$, primary natural angular frequency of cavity resonance of the gas charged in the tire inner cavity of the assembly of the tire and the rim with no load exerted thereon is $\omega$, viscosity coefficient of the charged gas is $\eta$, and peripheral thickness $\delta$ of the charged gas around fibers of unwoven cloth is defined by a formula below, $$\delta = \sqrt{\frac{2\eta}{\omega \rho_a}}$$

the average distance d between fibers is within the range of 0.50δ to 4.00δ.

2. The assembly of a tire and a rim of claim 1, wherein the sound absorbing member is provided on an inner surface of an inner liner.

3. The assembly of a tire and a rim of claim 1, wherein the sound absorbing member is provided on the rim.

* * * * *